Dec. 30, 1969 F. A. KARNER 3,487,235
FLOATING TUNNEL DIODE HYBRID LATCH
Filed Oct. 10, 1966

INVENTOR
FRIEDRICH A. KARNER

BY John C Black
ATTORNEY

United States Patent Office 3,487,235

Patented Dec. 30, 1969

3,487,235

FLOATING TUNNEL DIODE HYBRID LATCH

Friedrich A. Karner, Apalachin, N.Y., assignor to International Business Machines Corporation, Armonk, N.Y., a corporation of New York Filed Oct. 10, 1966, Ser. No. 585,539
Int. Cl. H03k *17/58*
U.S. Cl. 307—253 3 Claims

ABSTRACT OF THE DISCLOSURE

A high speed tunnel diode transistor-inverter switch couples logical signals at one or the other of two logical levels to an output circuit, each of the logical levels being controllable within widely varying limits. The emitter electrode of the transistor is connected to one controllable voltage supply which forms one logical input and the collector electrode is connected by way of a series-connected inductor and resistor to another controllable voltage supply which forms the other logical input. Input signals to the base electrode switch the transistor and tunnel diode between their two states. One bias supply for the diode and transistor is a constant level supply irrespective of the levels of the signal supplied to the emitter and collector electrodes. A second bias supply for the tunnel diode and transistor varies directly as a function of the difference in voltage between the two supply levels at the emitter and collector electrodes. Approximately equal constant rise and fall times for the output voltages are assured irrespective of the operating supply levels and the current levels.

Figure 1:
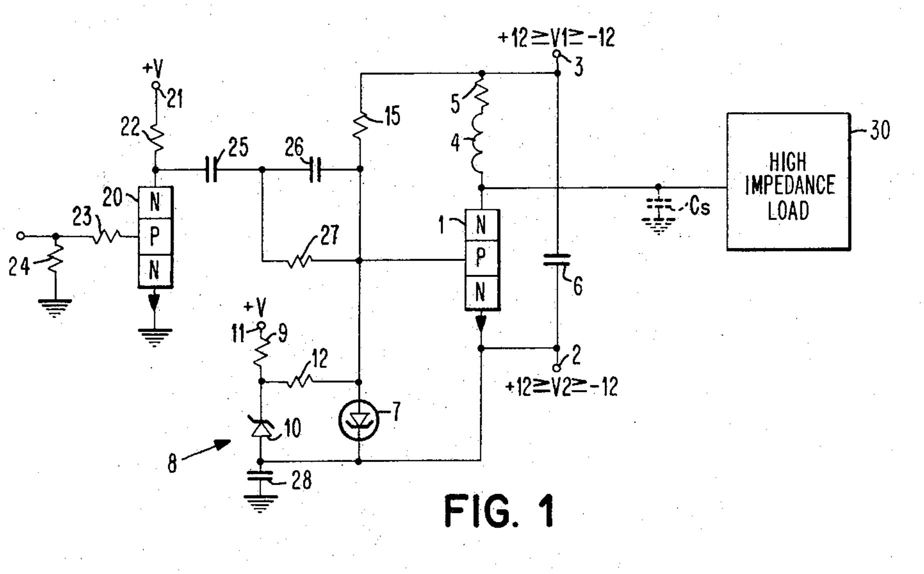

This application relates generally to an improved bistable latch, and more specifically to one which is capable of switching one or the other of its operating potentials to its output terminal at high speed and with relatively constant, minimum voltage drops in an environment wherein the operating supply levels vary widely.

The improved circuit of the present application has been designed for use in test apparatus; however, it will be appreciated that its output can be coupled to any suitable high impedance load for other uses.

In apparatus which is designed for testing electronic logic circuits, means in the form of a voltage switch must be provided for applying to each of the inputs of the circuits under test, input signals of one and then another voltage level. One of the voltage levels is representative of a logical "1" and the other level of a logical "0" condition.

Depending upon the types of circuits being tested, the values of the voltages may lie, for example, somewhere between plus and minus twelve volts. In addition, the difference in voltage between logical "1" and logical "0" signal levels may be as low as one-half volt and as high as twelve volts. The current levels in the switch are also fairly high, e.g., forty milliamperes in one case.

For testing certain types of circuits, for example, A-C (alternating-current) coupled triggers, one of the input signals must have a rise or fall transient time of extremely short duration, for example, ten nanoseconds or less, depending upon the circuit specifications.

In addition, with the advent of the automatic testing of electronic circuits, the rate at which circuits are tested continually increases. As a result, the speed of operation of the test circuits themselves is continually increasing, and has come to the point at which the application of input signals is made preferably or necessarily by means of semiconductor switching arrangements.

Apparatus of the type in which the circuit of the present application is particularly useful is described more fully in a copending U.S. patent application of Harold E. Jones, Friedrich A. Karner, the inventor herein, and Ernest H. Millham, entitled "Apparatus for Testing Electronic Circuits," Ser. No. 585,547 and filed Oct. 10, 1966. Said copending application, which is assigned to the assignee of the present application, is hereby incorporated herein by reference as if it were set forth in its entirety.

Within the environment of apparatus for testing logic circuits, it becomes necessary to maintain the logical input signals to a circuit under test at one or the other of two voltage levels for varying intervals. During each interval, one or several tests may be conducted with respect to the circuit. Consequently, it becomes desirable to make the voltage switch bistable.

Because of the speed at which we wish to test circuits, electromechanical relays become impractical. With carefully designed relays, very rapid voltage transients can be produced to satisfy many A-C trigger input requirements; however, the rate at which relays can be switched on and off for sequential high speed testing of circuits is extremely limited. Consequently, the need arises for a solid state semiconductor voltage switch which not only provides more rapid operation but space-saving and packaging advantages. However, the provision of a high speed, bistable semiconductor voltage switch which can provide reasonably accurate and consistent output levels with widely varying input levels gives rise to a difficult design problem. Typical latches and semiconductor switches are sensitive to such wide variations in operating supply potentials. In addition, many of the conventional bistable semiconductor latches are limited in transient response times. Consequently, the design of a high speed latch of moderate accuracy and consistency within the contemplated environment gives rise to a rather difficult design problem.

In the preferred environment of use, the voltage rise and fall times at the switch output should be as short as possible and approximately equal. They should not change appreciably with changes in the voltage levels to be switched. The voltage switches should also exhibit appreciable current drive characteristics.

It is therefore an object of the present invention to provide for use in electronic test apparatus an improved high speed means for switching widely varying voltage levels to an electronic circuit under test.

The above object is achieved in a preferred embodiment of the invention by providing a hybrid latch including a transistor switch and a tunnel diode connected across the base-emitter electrodes of the switch.

The tunnel diode causes the transistor switch to be at cut off and saturation respectively when the diode is in its low voltage, high current state and its high voltage, low current state. The high voltage level of the diode must be sufficient to assure forward biasing of the base-emitter junction of the transistor at saturation levels. A suitable gallium arsenide diode can be selected to achieve this result.

The selection of a suitable hybrid tunnel diode-transistor circuit for use as a voltage switch is not readily apparent. The typical application of this hybrid circuit is in environments wherein the operating supply for the transistor switch is substantially constant. In such an environment, the tunnel diode and transistor can be given a substantially constant bias supply to achieve optimum results with respect to speed of operation. In its simplest form, the constant current bias supply has been a resistor connecting the collector bias supply to the tunnel diode and base electrode, the value of the resistor determining the bias level.

However, in the environment wherein the voltage switch of the present application is intended for use, the constant current bias supply cannot achieve the desired results of relatively high speed turn-on and turn-off for all operating conditions. The level of the constant current would necessarily be selected to assure operation of the transistor switch in saturation with the highest of emitter-to-collector operating supply which can be anticipated. However, it is well known that the base current required to saturate a transistor varies as a function of the collector saturation current of the switch and, therefore, varies as a function of the operating supply level. If the bias current assures saturation at high collector currents, this bias current would be so great when applied to the switch when it has a relatively low collector current, that the turn-off times of the transistor switch due to excessive base storage charge would be intolerable.

If, instead of providing a constant bias current for the tunnel diode and the transistor switch, we provide a bias current which varies with the magnitude of the operating supply potential, the likelihood of achieving a feasible circuit becomes impossible. In the first place, if the operating supply level can be as low as five-tenths volt, it is incapable of biasing the tunnel diode at its high voltage stable state and is further not sufficiently high to bias the base-emitter of the transistor to the saturation level. But, even if this could be compensated for, the circuit would still be unsatisfactory since in the preferred environment of operation the magnitude of the operating supply can vary over a twenty-four to one range. This would require a variation in the tunnel diode bias current in the order of twenty-four to one. However, tunnel diodes have peak current to valley current ratios typically in the order of approximately six to twelve. Consequently, the tunnel diode cannot be operated with bias levels which exceed these ratios.

The operation of the improved hybrid latch as a voltage switch in the intended environment is achieved by a suitable combination of a selected constant current bias supply and a suitable variable level bias supply.

The emitter electrode of the transistor is connected to a controllable voltage supply which forms one logical input to the circuit under test. The collector electrode of the switch is connected by way of a series-connected inductor and resistor to another controllable voltage supply which forms the other logical input to the circuit under test.

The collector electrode of the transistor switch forms the output of the switch and is adapted for connection with the circuit under test by way of a high impedance load circuit. One supply is, therefore, coupled to the circuit under test via the emitter-collector circuit; and the other via the inductor and resistor. The transistor is selected for high speed switching capabilities, at least moderately high H*fe* (common emitter current gain), a minimum collector-to-emitter saturation drop for maximum consistency, and an adequate collector-to-emitter breakdown voltage. The difference in voltage supply levels must exceed the collector-to-emitter saturation voltage of the selected transistor. Silicon transistors are available with approximately two-tenths volt collector-to-emitter saturation voltages.

A constant current bias supply for the tunnel diode and the transistor switch includes a series-connected resistor and Zener diode connected between the emitter supply potential and a reference potential which assures operation of the Zener diode in its reverse breakdown mode, irrespective of variations in the emitter supply level. A second resistor is connected in series with the parallel-connected tunnel diode and base-emitter junction; and this series circuit is connected across the Zener diode to provide a substantially constant current bias supply for the tunnel diode and transistor.

An additional resistor is connected between the collector supply potential and the junction between the tunnel diode and the base electrode. This resistor provides a bias current for the tunnel diode and transistor switch which varies essentially as a function of the difference in potential between the emitter and collector supplies.

It is this latter resistor, together with the constant bias current source which assures rapid voltage transients at the output of the transistor for all operating voltage levels and which assures relatively constant and approximately equal rise and fall times for the output voltage.

Means are provided for coupling signals to the junction between the base electrode and the tunnel diode for switching the latch from one state to the other.

It is therefore a more specific object of the present invention to provide improved means for switching widely varying voltage levels, which means is characterized by a hybrid latch including a transistor switch with a bistable tunnel diode connected across its base-emitter terminals, wherein the latch utilizes as its operating supply the two voltage levels which are to be switched into a high impedance load circuit.

It is a more specific object of the present invention to provide the improved switching means of the preceding object further characterized by a constant current bias supply for the tunnel diode and the transistor, together with an additional bias supply which varies as a function of the difference in voltage between the two supply levels of the latch.

It is also an object of the present invention to provide improved bias means for a hydrid tunnel diode-transistor latch to assure approximately constant rise and fall times for output voltages, irrespective of the operating supply levels.

The foregoing and other objects, features and advantages of the invention will be apparent from the following more particular description of a preferred embodiment of the invention, as illustrated in the accompanying drawings.

Figure 2:
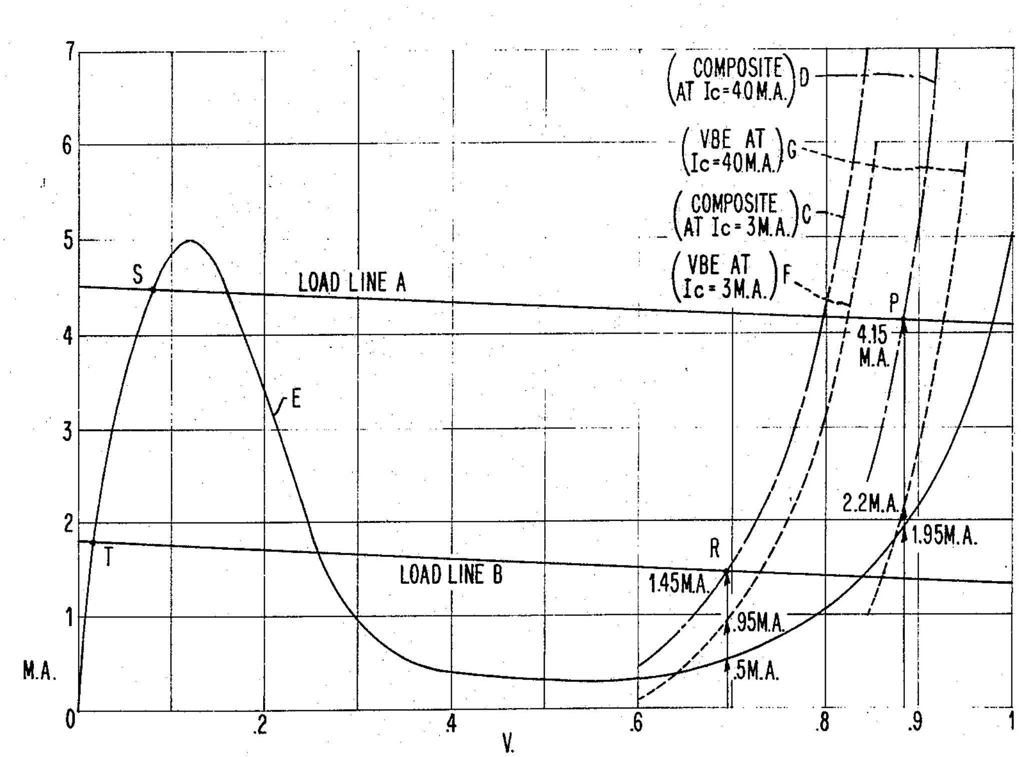

In the drawings:

FIG. 1 is a schematic diagram illustrating a preferred form of the improved hybrid latch; and FIG. 2 shows certain current-voltage characteristic waveforms which illustrate the manner in which the improved circuit of FIG. 1 operates.

As seen in FIG. 1, the improved latch includes a transistor switch, having its emitter electrode connected to a supply terminal 2 and its collector electrode connected to a supply terminal 3 by way of an inductor 4 and a resistor 5. The collector electrode is coupled to a high impedance load 30.

As explained more fully in said copending application of Harold E. Jones et al., voltages V2 and V1 at the terminals 2 and 3 may be varied over a wide range. For example, in said copending application it was assumed that both V1 and V2 were varied under computer control to selected values between approximately plus and minus twelve volts. The difference between V1 and V2 in said copending application was varied under computer control to selected values between approximately five-tenths volt and approximately twelve volts. It was further assumed that the computer control guaranteed V1 to be always positive with respect to V2.

A capacitor 6 is connected between the terminals 2 and 3 to reduce noise in the output circuit.

A tunnel diode 7 is connected across the base-emitter electrodes of the switch 1. A constant current bias source 8 for the tunnel diode and the transistor switch includes a first resistor 9 and a Zener diode 10 connected in series between a positive supply terminal 11 and the terminal 2. The voltage at the terminal 11 is more positive than the maximum positive potential at the terminal 2 by a value substantially greater than the reverse breakdown voltage of the Zener diode 10. For example, if the most positive potential (V2) at the terminal 2 is plus twelve volts and assuming a reverse breakdown voltage of ten volts for the Zener diode, a suitable voltage for the terminal 11 would be approximately thirty volts, thus guaranteeing operation of the Zener diode at all times in its reverse breakdown mode.

A resistor 12 is connected in series with the parallel-connected tunnel diode 7 and base-emitter junction of the transistor 1, and this series circuit is in parallel with the Zener diode. The Zener diode provides a constant voltage across the series circuit including the resistor 12 and the parallel-connected tunnel diode 7 and base-emitter junction of the transistor 1. Since the maximum voltage across the parallel-connected tunnel diode 7 and the base-emitter junction is in the order of about nine-tenths volt and the Zener diode voltage is ten volts, the value of the resistor 12 essentially determines the value of the current applied to the tunnel diode and the base-emitter junction. This current is substantially constant.

A resistor 15 connects the tunnel diode and the base electrode to the supply terminal 3. This resistor establishes a bias current for the tunnel diode and the base-emitter junction which varies with the difference between V1 and V2. When V1–V2 is large compared to the tunnel diode voltage drop, the variations in voltage across the parallel-connected tunnel diode are not sufficiently large to noticeably affect the level of current provided by the resistor 15; the bias current being approximately equal to V1—V2 divided by the value of the resistor 15. However, as the value of V1—V2 approaches its lower limits, the high or low voltage state of the tunnel diode has a more significant effect upon the bias current level. For example, if it is assumed that $V1-V2=1$ volt, the bias current through the resistor 15 is almost zero when the tunnel diode is in its high voltage state. When $V1-V2=$five-tenths volt and the tunnel diode is in its high voltage state, the direction of current flow through the resistor 15 reverses itself. This minimizes the base current into the saturated transistor to improve the turnoff delay of the transistor.

Means for switching the tunnel diode 7 from one stable state to the other include a transistor switch 20 having its emitter electrode connected to ground potential and having its collector electrode connected to a positive supply terminal 21 by way of a resistor 22. The base electrode is adapted to be coupled to a source of input switching signals (not shown) by way of an input circuit including resistors 23 and 24. The voltage swings at the collector electrode of the transistor 20 are differentiated and coupled to the tunnel diode and the transistor switch 1 by means of a differentiating capacitor 25 and a parallel-connected capacitor 26 and resistor 27.

A capacitor 28 couples the terminal 2 to ground potential.

A high impedance load 30, connected to the collector electrode of the transistor 1, can be in the form of an emitter follower.

When the transistor switch 20 is turned on, a negative pulse switches the tunnel diode to its low voltage state, thereby turning the transistor switch 1 off. When the transistor 20 is turned off, a positive output pulse switches the tunnel diode to its high voltage state, thereby turning the transistor switch 1 on. The tunnel diode changes state in a fraction of a nanosecond, thereby applying an extremely fast voltage level change to the base electrode of the transistor switch 1. This will minimize the turn-on and turn-off times of the switch 1.

When the tunnel diode turns the transistor switch 1 on, V2 will be applied to the load 30. However, a stray capacitance *Cs* which exists at the output has already been charged to the level of the supply voltage V1. Consequently, the change in voltage level at the load is delayed by the time required to charge the capacitance *Cs* to the new level. The total time delay in producing the desired change in level at the load is approximately the sum of the switching time of the tunnel diode 7, the turn-on delay of the transistor switch 1 per se, and the time required to charge the capacitance *Cs* to the new level.

When the tunnel diode 7 is switched to its low voltage state to turn the transistor switch 1 off, the supply V2 is disconnected from the load 30; and the supply V1 is connected thereto by way of the resistor 5 and the inductor 4. The value of the resistor 5 is made relatively low compared to the value of the high impedance load 30; and the D-C resistance of the inductor 4 is even smaller, whereby the voltage drop across the resistor and inductor is negligible. The capacitance *Cs* must be charged to the new voltage level of V1 through the resistor 5 and the inductor 4. Thus the total turn-off delay for producing a change in level at the load 30 in response to switching of the transistor 20 is the sum of the switching time of the tunnel diode 7, the turn-off delay of the transistor 1 and the time required for charging the stray capacitance *Cs*.

The inductor 4 reduces the time for charging the stray capacitance to the new level when the transistor switch 1 is turned off. It maintains the collector current *Ic* flowing momentarily to assist in rapidly charging the stray capacitance. The value of the inductor 4 must be maintained at a low level, however, to avoid overshoot or ringing on the output line.

In one assembled embodiment using the component values set forth below, the total turn-on and turn-off delays were held to approximately ten nanoseconds. Even shorter delays can be achieved by the selection of suitable components. Suitable values for the circuit of FIG. 1 are given by way of example only:

| Resistors: | | Values in ohms |
|---|---|---|
| 5 | | 300 |
| 9 | | 22000 |
| 12 | | 6200 |
| 15 | | 4500 |
| 22, 27 | | 1000 |
| 23 | | 750 |
| 24 | | 66 |
| **Capacitors:** | | **Value** |
| 6 | microfarads | 3.3 |
| 25 | picofarads | 1000 |
| 26 | do | 50 |
| 28 | microfarads | 2.2 |
| **Inductor:** | | |
| 4 | microhenry | 1 |

The operating characteristics of the improved voltage switch, having the component values set forth above, will be described, attention being directed to FIG. 2. The tunnel diode 7 is biased under all possible operating conditions such that input signals from the transistor switch 20 will switch the tunnel diode between two stable operating states. With particular reference to FIG. 2, it will be seen that the two stable states of the tunnel diode will depend upon the difference in magnitude between the supply voltages V1 and V2. Only two operating conditions are illustrated, i.e. V1—V2 equals twelve volts and one and one-tenth volts.

When the difference between V1 and V2 is twelve volts, load line A defines a low voltage state S and a high voltage state P for the tunnel diode. With V1 minus V2 equal to twelve volts and resistor 5 equal to three hundred ohms, the collector saturation current of the transistor 1 equals approximately forty milliamperes.

When the difference in voltage between V1 and V2 is one volt, load line B defines stable operating points T and R for the tunnel diode; and the collector saturation current is approximately three milliamperes.

When the difference between the voltage levels of V1 and V2 is one-half volt, the load line (not shown) will be below load line B to establish a pair of stable operating states for the tunnel diode. Thus it can be seen that a different set of stable operating states will exist for each value of V1 minus V2; and the value of the total biasing current for the tunnel diode and for the transistor will vary as a function of the difference between V1 and V2.

The composite operating curves C and D, which are only partially shown, are arrived at by summing the current values of the tunnel diode characteristic curve E and the transistor current voltage characteristic curves F and G at the prescribed collector current levels, for example, three and forty milliamperes, respectively. The value of the base current for a given set of operating conditions is determined by subtracting the value of the tunnel diode current from the total current value which exists at the intersection of the load line and the pertinent composite curve.

At point P, the total bias current is approximately four and fifteen-hundredths milliamperes; and the tunnel diode current is approximately one and ninety-five hundredths milliamperes. Therefore, the base current is approximately two and two-tenths milliamperes. This base current assures saturation of a transistor switch 1 when the collector current at saturation is thirty-six milliamperes.

At point R, the total bias current is approximately one and forty-five hundredths milliamperes; and the tunnel diode current is approximately five-tenths milliamperes. The base current is, therefore, approximately ninety-five hundredths milliamperes which assures saturation of the transistor switch 1 with an operating supply which produces a collector current of three milliamperes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an electronic circuit for alternatively connecting one or the other of a pair of input signal terminals, the voltage levels of which vary widely in value and polarity with one terminal, however, always being more positive than the other, to an output terminal with high switching speeds and minimum voltage drops; the combination comprising, a common emitter transistor switch having a base electrode, having an emitter electrode coupled to one of said input signal terminals and having a collector electrode coupled to the other one of said input signal terminals and to the output terminal;

the transistor switch being selected to have an emitter-to-collector voltage drop characteristic in saturation which is lower than the lowest voltage difference across the input terminals;

a tunnel diode connected across the base-emitter electrodes of the transistor for causing operation of the transistor alternatievly in its saturated state or its substantially nonconducing state incident to operation of the diode in its high voltage and low voltage states, respectively;

constant current bias means connected to the diode and the transistor;

additional bias means supplying a bias current to the diode and transistor at a level which is a function of the difference between the potential levels at the input terminals; and means for applying input pulses to the diode and transistor for selectively switching the diode and transistor from one state to the other.

2. The circuit of claim 1 wherein said additional bias means comprises a first resistor of selected value coupling the tunnel diode and the base electrode to said other input signal terminal.

3. The latch of claim 2 wherein said constant current bias means comprises a supply potential, a Zener diode and a second resistor connected in series between the supply potential and said one input signal terminal, the supply potential having a level and polarity which assures operation of the Zener diode in its reverse breakdown mode for all values of voltage appearing at said one input signal terminal, and a third resistor of selected value connected in series with the tunnel diode and this series circuit being connected in parallel with the Zener diode to produce a substantially constant current in the third resistor.

References Cited

UNITED STATES PATENTS 3,274,399 9/1966 Sheng ---------- 307—286 X

DONALD D. FORRER, Primary Examiner

U.S. Cl. X.R.

307—322